Patented May 26, 1953

2,640,036

UNITED STATES PATENT OFFICE 2,640,036

PROCESS FOR MAKING LATEX SPONGE RUBBER

Philip D. Brass, Mahwah, and James U. Mann, Teaneck, N. J., assignors to United States Rubber Company, New York, N. Y., a corporation of New Jersey No Drawing. Application February 15, 1951, Serial No. 211,178

4 Claims. (Cl. 260—2.5)

The present invention relates to a process for making latex sponge rubber.

It has been suggested to release carbon dioxide by chemical reaction in latex, or to pass carbon dioxide gas into latex to form a porous coagulated latex sponge. Such processes lack the flexibility accompanying the manufacture of latex foam sponge products where an uncoagulated foam is first formed and then shaped as by pouring into molds, and the thus shaped foam is finally coagulated. It has also been suggested to form an uncoagulated latex foam by releasing carbon dioxide by chemical reaction in a latex or by releasing the pressure on a carbon dioxide charged latex which has been stabilized against coagulation by carbon dioxide and which contains heat-sensitizing agents, shaping the foam and heating to coagulate the same. Such heat-sensitizing agents have a tendency to destabilize latex at room temperature and may prematurely coagulate the latex foam. Uncoagulated latex foams, such as those prepared by mechanically whipping or chemically liberating a gas in the latex, have been coagulated by freezing, and have also been frozen without coagulation, followed by the introduction of carbon dioxide into the frozen uncoagulated foam to coagulate the same. From our experience, such freezing operations are not satisfactory for commercial operation because of the expense.

We have overcome the above difficulties by mechanically whipping or chemically liberating a non-coagulating gas in a rubber latex which is coagulable with carbon dioxide to form a fluid uncoagulated latex foam that may be shaped, as by pouring into a mold or spreading on a surface, and then coagulating the shaped foam while in the fluid state by diffusing carbon dioxide throughout the fluid foam. The carbon dioxide becomes distributed throughout the foam, by diffusion, which takes place fairly rapidly after the carbon dioxide has been introduced into the foam. The carbon dioxide coagulates the foam as it diffuses through the foam. Latex foam is a fragile frothy mass. The walls of the air bubbles therein are continuous. One would expect that any attempt to pass a gas through such foam would result in breakdown and collapse of the cellular structure. In view of these facts it is surprising that carbon dioxide can be passed through the foam to coagulate the latex therein without concurrently destroying the cellular structure. The behavior of the carbon dioxide in this process appears to be unique. When sulfur dioxide and hydrogen sulfide were substituted for carbon dioxide in the process of the invention, the resulting sponge products were unsatisfactory, both evidencing collapse and distortion throughout. Further, if air is introduced in the foam along with the carbon dioxide, collapse results.

In carrying out the present invention, rubber latex is compounded with the usual compounding ingredients for subsequent vulcanization and made into a fluid uncoagulated froth in a known manner, such as by whipping the latex into a foam or chemically releasing a non-coagulating gas in the latex as by decomposition of hydrogen peroxide in the latex. The latex should be free of added heat-sensitizing agents which would undesirably thicken the latex at working temperatures. After the latex has been made into a foam, the foam is shaped, and the shaped uncoagulated foam is coagulated by diffusing carbon dioxide throughout the foam. The carbon dioxide may be introduced into the foam through perforate or porous sections of the mold, such as a cushion mold, or through a perforate or porous base, or conveyor, as in making so-called sheet stock or flat stock. For example, sponge cushions are conventionally made with parallel spaced openings or cored-out cavities in the interior of the cushion extending from the base of the cushion towards the opposite face but terminating short of such opposite face to provide a smooth seating or back-resting surface for the cushion. The cavities are formed by cores in the mold cover extending into the mold proper into which the latex is poured and which shapes the cushion, as shown in U. S. Patents 2,310,830 and 2,347,117. The cores in the top or cover of such cushion mold may be made of perforate or porous metal, plastic, refractory or paper material. The cores are connected to a source of carbon dioxide under pressure, and after the foam has been shaped, the carbon dioxide may be introduced into the foam through such cores to coagulate the same. Sponge rubber sheet stock or flat stock may be made, as is known, by spreading or pouring the latex foam on a continuous conveyor with side guide ledges along the conveyor at the desired width of the sheet, and if desired, with dividing ledges across the width of the conveyor to give sheets of any desired length. Alternatively, the conveyor may be equipped with flat pans of the desired dimensions of the sheets. This is shown in U. S. Patent 2,441,235. Such base or conveyor may be made of perforated or porous sheet material which passes over a source of carbon dioxide under pressure after the latex foam is poured into the conveyor to shape the same. The carbon dioxide gas, which is forced through the conveyor, will diffuse throughout the thickness of the latex foam and produce a coagulated sponge sheet. The latex foam in the mold or on the conveyor, which has been coagulated by the diffusion therethrough of carbon dioxide at room temperature (15° C. to 35° C.), may be vulcanized at elevated temperatures in the usual manner.

We have found that in such procedures of introducing the carbon dioxide in the latex foam in the mold or on the conveyor, it is desirable that the pressure of the carbon dioxide be less than 1 lb. per square inch (gauge pressure), and preferably from 0.03 to 0.3 lb. per square inch. Higher pressures tend to cause the foam to break down, and lower pressures extend the coagulation time unduly long. Also in such molds or conveyors, the carbon dioxide should be introduced into the foam from various points in such manner that the greatest distance through the uncoagulated foam which the carbon dioxide must travel or diffuse is 3 inches as measured from the nearest point from which the carbon dioxide has bodily access to the foam. This point is not necessarily measured from the port through which the carbon dioxide enters the mold. As the foam progressively coagulates, it pulls away from the mold and thus provides unobstructed paths along which the carbon dioxide travels to reach more distant parts of the mold. Therefore, no portion of the latex foam to be coagulated by the carbon dioxide should be farther than 3 inches from the nearest surface of the foam. When the carbon dioxide is forced to pass directly through more than 3 inches of foam, the coagulum formed at the greater distances is torn and uneven. This breakdown may be so complete as to render the entire molded product unusable. One of the principal reasons for this behavior is probably the tension created in the uncoagulated sections of foam by the shrinkage, during coagulation, in the portions of the foam through which the carbon dioxide first passes.

Other arrangements for introducing the carbon dioxide into the latex froth can be used. For example, the entire mold surface may be perforated or porous and the complete mold placed in an atmosphere of carbon dioxide under suitable pressure. The pressure at which the carbon dioxide enters the latex froth is principally governed by the degree of porosity of the porous section of the mold, and the external pressure of the gas on the porous section. With high external pressures and high porosity the external pressure will be substantially the same as the internal entering pressure; but when materials of low porosity are used, the external pressure will be substantially greater than the pressure at which the gas enters the froth latex. Other non-coagulating gases, for example, air, should not be introduced into the latex froth under pressure with the carbon dioxide, since the presence of such other gases in the system tends to cause the froth to break down during coagulation.

The rubber latex for the preparation of sponge cushions according to the present invention may be natural rubber latex or a butadiene polymer synthetic rubber latex or mixtures of the same. Such butadiene polymer synthetic rubber latex may be an aqueous emulsion polymerizate of various butadienes-1,3, for example, butadiene- 1,3, isoprene, chloroprene, piperylene, 2,3-dimethylbutadiene-1,3, or mixtures thereof, or mixtures of one or more such butadienes-1,3 with one or more polymerizable compounds which are capable of forming rubbery copolymers with butadienes-1,3, for example, up to 70% of such mixture of compounds which contain a $CH_2=C<$ group where at least one of the disconnected valences is attached to an electroactive group, that is, a group which substantially increases the electrical dissymmetry or polar character of the molecule. Examples of compounds which contain a $CH_2=C<$ group and are copolymerizable with butadienes-1,3 are aryl olefins, such as styrene, alpha methyl styrene, para-chlorostyrene, dichlorostyrene, and vinyl naphthalene; the alphamethylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride.

The following examples illustrate the preparation of latex sponge by the process of the present invention, all parts and percentages being by weight:

*Example I*

A natural rubber latex, containing 66.3% total solids and stabilized with 0.75% of ammonia on the solids, is compounded with the following materials in the proportions indicated:

| | Dry | Wet |
|---|---|---|
| Latex | 100 | 150.5 |
| Potassium oleate (20% aqueous) | 2.8 | 14.0 |
| Composite curative paste: | | 15.0 |
| Sulphur | 1.5 | |
| Accelerator | 2. | |
| Zinc Oxide | 5. | |

The thus compounded latex is then mechanically whipped to a froth (density ca. 0.125) and poured into a metal cushion-shaped mold having porous heavy filter paper cores extending from the metal mold cover into the interior of the mold proper. The mold cover is connected to a source of carbon dioxide under pressure so that the carbon dioxide can be introduced into the foam in the mold through the paper cores. No portion of the frothed latex in the mold is farther than 1.5 inches from the nearest surface of the foam. Carbon dioxide is passed through the foam in the mold through the filter paper cores under an entering pressure of .14 lb./sq. in. The latex froth is entirely coagulated in five minutes. The finished product has a fine porous structure.

*Example II*

A latex similar to that of Example I is compounded as follows:

| | Dry | Wet |
|---|---|---|
| Latex | 100 | 150.5 |
| Potassium oleate (20% aqueous) | 2. | 10. |
| Formaldehyde (37% aqueous) | .93 | 2.52 |
| Composite curative paste: | | 15. |
| Sulphur | 1.5 | |
| Accelerator | 2. | |
| Zinc oxide | 5. | |
| Methyl cellulose (thickener) | 5. | 100. |

The formaldehyde is added to reduce the ammonia content of the latex to .4 per 100 of rubber. After the latex is compounded it is cooled to 5° C., and 10 parts of 30% aqueous hydrogen peroxide are added, then 3 parts of 10% aqueous yeast paste. The yeast catalyzes the decomposition of the hydrogen peroxide, which liberates oxygen to form the latex foam. After the hydrogen peroxide and yeast have been added to the latex but before decomposition of the hydrogen peroxide commences, the latex is poured into a mold similar to that used in Example I. The blowing operation is allowed to go to completion in the mold. Carbon dioxide is then passed into the fluid froth as in Example I, and the froth is thereby coagulated. The sponge product after vulcanization is found to have a very even, cellular structure.

*Example III*

AGR–S (butadiene-styrene copolymer) synthetic rubber latex is compounded with the following ingredients in the proportions indicated:

|  | Dry | Wet |
|---|---|---|
| G R–S latex | 48.75 | 75. |
| Potassium oleate | .5 | 2.5 |
| Triethyltrimethylene triamine (Froth stabilizer) | 1.0 | 10. |
|  |  | 7.5 |
| Composite curative paste: |  |  |
| Sulfur | .8 |  |
| Accelerator | 1.0 |  |
| Zinc oxide | 2.7 |  |

The compound latex is whipped to a froth and poured into a mold. Carbon dioxide is passed through the latex froth as in the previous examples to cause coagulation, and the coagulated froth is cured. The resultant sponge product has a uniform, fine, porous structure.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The process of making latex sponge rubber which comprises forming into a fluid uncoagulated foam a rubber latex selected from the group consisting of natural rubber latex and butadiene polymer synthetic rubber latices which is coagulable with carbon dioxide shaping the uncoagulated foam, and coagulating the shaped foam while in the fluid state by means of an atmosphere consisting of carbon dioxide gas under pressure of at least 0.03 pound per square inch gauge pressure and less than one pound per square inch gauge pressure, the size and shape of said shaped fluid foam being such that the carbon dioxide travels not more than three inches through uncoagulated foam.

2. The process of making latex sponge rubber which comprises forming into a fluid uncoagulated foam a butadiene-styrene copolymer synthetic rubber latex composition which is coagulable with carbon dioxide, shaping the uncoagulated foam, and coagulating the shaped foam while in the fluid state by means of an atmosphere consisting of carbon dioxide gas under pressure of 0.03 to 0.3 pound per square inch gauge pressure, the size and shape of said shaped fluid foam being such that the carbon dioxide travels not more than three inches through uncoagulated foam.

3. The process of making latex sponge rubber which comprises forming into a fluid uncoagulated foam a natural rubber latex composition which is coagulable with carbon dioxide, shaping the uncoagulated foam, and coagulating the shaped foam while in the fluid state by means of an atmosphere consisting of carbon dioxide gas under pressure of at least 0.03 pound per square inch gauge pressure and less than one pound per square inch gauge pressure, the size and shape of said shaped fluid foam being such that no portion of the foam is more than three inches from the nearest surface of the foam.

4. The process of making latex sponge rubber which comprises forming into a fluid uncoagulated foam a rubber latex selected from the group consisting of natural rubber latex and butadiene polymer synthetic rubber latices which is coagulable with carbon dioxide, shaping the uncoagulated foam, and coagulating the shaped foam while in the fluid state by means of an atmosphere consisting of carbon dioxide gas under pressure of 0.03 to 0.3 pound per square inch gauge pressure, the size and shape of said shaped fluid foam being such that no portion of the foam is more than three inches from the nearest surface of the foam.

PHILIP D. BRASS.
JAMES U. MANN.

References Cited in the file of this patent

UNITED STATES PATENTS

| Number | Name | Date |
|---|---|---|
| 2,432,353 | Talalay | Dec. 9, 1947 |
| 2,604,663 | Talalay | July 29, 1952 |

FOREIGN PATENTS

| Number | Country | Date |
|---|---|---|
| 337,946 | Great Britain | Nov. 13, 1930 |
| 411,202 | Great Britain | June 7, 1934 |

OTHER REFERENCES

Chapman, Rubber Age and Synthetics, July 1947, pages 144 and 145.